United States Patent [19]

Miyamae

[11] 4,425,729
[45] Jan. 17, 1984

[54] FISHING ROD HOLDER FIXING MEANS

[76] Inventor: Toshiaki Miyamae, 36-8, Aramoto, Higashi-Osaka, Osaka-pref, Japan

[21] Appl. No.: 294,752

[22] Filed: Aug. 20, 1981

[51] Int. Cl.³ ............................................. A01K 97/10
[52] U.S. Cl. ..................................... 43/21.2; 248/538
[58] Field of Search ................. 43/21.2; 248/515, 538; 444/104, 105; 403/104, 362, 373

[56] References Cited

U.S. PATENT DOCUMENTS 3,246,865  4/1966  Latimer ............................... 248/515
4,159,816  7/1979  Miyamae .............................. 248/515

Primary Examiner—Nicholas P. Godici
Assistant Examiner—Peter Martine

[57] ABSTRACT

The invention is concerned with a construction of a rod holder fixing means comprising a rod holder and a cylinder detachably pivoted thereon, wherein a spacer is suspended on a side of the cylinder, and adapted to be adjustably pressed against the inside of a rod hole by screwably moving a bolt through the cylinder so that the means is slidably insertible into any rod hole regardless of the diameter, position and inclination thereof with respect to the gunnel surface of a fishing boat and fixedly mountable on or above the gunnel regardless of the width and shape thereof.

1 Claim, 2 Drawing Figures

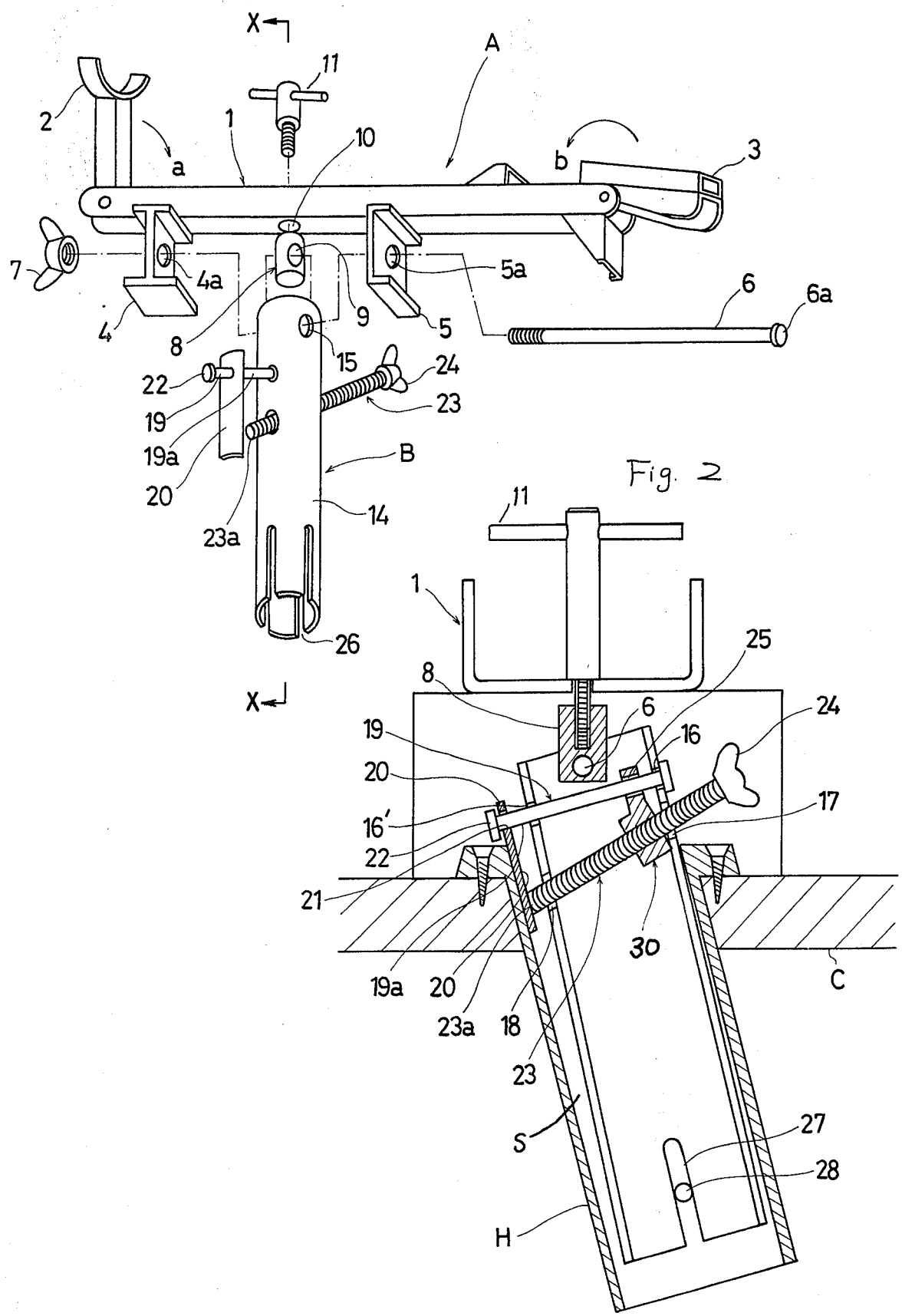

FISHING ROD HOLDER FIXING MEANS

BACKGROUND OF THE INVENTION

The present invention relates generally to improvements in a fishing and holder fixing means and more particularly to a means for rigidly fixing a fishing rod holder into any rod hole provided on the gunnel of a fishing boat in angularly free relation with respect to the plane thereof.

Generally in case of fishing by boat, it is necessary to detachably fix a fishing rod to a gunnel of the boat. However, all the fishing rod holder means presently on the market are not accessible to the gunnel since they are subject to the width and shape thereof.

STATEMENT OF OBJECTS

Accordingly the present invention has been contrived to eliminate the above-mentioned drawbacks of the conventional type fishing rod holders and has as one of its main objects the provision of an improved simple construction of a means for rigidly fixing a rod to the gunnel of a fishing boat regardless of the shape and width thereof.

Another object of the invention is to provide a means applicable to most fishing rod holders already on the market.

Another object of the invention is to provide a means for fixing a fishing rod holder to a fishing boat through rod holes provided on the gunnel thereof.

A still further object of the invention is to provide a means for fixing a fishing rod holder which is applicable to any shape, diameter and inclination of rod holes provided on the gunnel of a fishing boat.

BRIEF DESCRIPTION OF DRAWINGS RELATING TO THE INVENTION

In the drawings,

FIG. 1 is an isometric view showing as the whole a fishing rod holder fixing means embodied in accordance with the invention; and FIG. 2 is a cross elevational view taken on the line X—X thereof.

DETAILED DESCRIPTION OF THE INVENTION

Setting forth now in detail a preferred embodiment of the invention with reference to the accompanying drawings, character A generally designates a main body of existing fishing rod holder means.

The main body or fishing rod holder means A comprises a lengthy base 1 of a channel shape in cross section, a rod supportor means 2 pivotally supported on an upper end of said base 1 in a manner to be movable in the direction shown by the arrow a in FIG. 1, a rod holding means 3 pivotally supported on the other upper end of base 1 in a manner to be movable in the direction shown by the arrow b and a pair of plates 4, 5 disposed in the bottom surface of base 1 in opposite relation with one another.

According to the present embodiment of the invention, the pair of plates 4, 5 are bored in each corresponding position thereof with holes 4a and 5a through which there is slidably inset a supporting rod 6 having an extremity fixedly provided with a thumbscrew 7 as shown in FIG. 1 while the other extremity of supporting rod 6 is screwably tightened by means of a suitable nut 6a.

In supporting rod portion 6 between pair of plates 4, 5 there is inserted an angle adjusting member 8 through a hole 9 bored transversing the axial direction thereof. The angle adjusting member 8 has its upper portion screwably mounted to the lengthy base 1 through a hole 10 thereof by means of a T shape bolt 11.

To the rod holder means A thus constructed is detachably mounted a rod holder fixing means B composed mainly of a cylindrical member 14 which is bored adjacent to the uppermost circumference thereof with a first pair of holes (one of which is shown by numeral 15 in FIG. 1 of the accompanying drawings) at a right angle with respect to the axis of cylindrical member 14, further being bored with a second pair of holes 16, 16'.

Below hole 16 and axially thereof is bored a third hole 17. Further axially below hole 16' and more than below hole 16 there is bored a fourth hole 18. Into these holes 16, 16' is slidably inserted a first straight bolt 19 having a larger outer diameter than the inner diameter of holes 16, 16'. Onto the foremost end portion 19a of straight bolt 19 protruded from the hole 16' is slidably inserted a spacer 20 through the hole 21 thereof. Thereafter the extremity of the bolt 19 is screwably provided with a nut 22.

Through holes 17, 18 the cylindrical member 14 has a second bolt 23 slidably inserted in a manner that the foremost end 23a of the bolt portion 23 protruded from the hole 18 is kept in contact with the lower inside portion of the spacer 20. The other end of the bolt 23 is integrally formed with a thumbscrew 24 for the reasons that will be described hereinafter.

Onto first bolt portion 19 in the inside of the cylindrical member 14 there is slidably inserted a nut means 30 through a hole 25 which is bored in the upper portion thereof while the lower portion is screwably inserted onto the second bolt 23. The lower portion of the cylindrical member 14 is provided with slits 26 axial thereof.

In practical use of the fishing rod holder fixing means embodying the present invention, the angle adjusting member 8 is firstly put in the cylindrical member 14, and nextly the supporting rod 6 is inserted into the members 14, and 8 through the holes 9, 4a, and 5a. Thereafter the foremost end of the supporting rod 6 is screwably tightened by means of thumbscrew 7 thereby inseparably connecting the cylindrical member 14 to the fishing rod holder A.

The cylindrical member 14 of the fishing rod holder fixing means thus formed in the above-mentioned manner is then inserted into any selected one of rod holes H generally formed on the gunnel C of a fishing boat by engaging slits 27 of the cylindrical member 14 with a rod support 28 provided radially in the lower portion of rod hole H. In this case, there is formed a circular space S between the outer circumferential surface of the cylindrical member 14 and the inner circumferential surface of the rod hole H as definitely shown in FIG. 2. However, the cylindrical member 14 is held circumferentially unmovable due to slits 27 which are engaged with the rod support 28 in upwardly slidable and circumferentially unmovable relation as has been mentioned above so that the fishing rod holder fixing means of the invention can be fixedly mounted either directly upon the gunnel surface C or at a desired height therefrom merely by vertically sliding the cylindrical member 14 along the rod support 28 and then screwably moving the thumbscrew 24 with finger-tips whereby the spacer 20 is pressed against the inner surface of the rod hole H by means of the extremity of the fixing bolt 23.

Incidentally, in case a rod hole H is a little too great in diameter than the outer diameter of the cylindrical member 14, first bolt means 19 may be adjusted by screwably loosening the nut 22 thereby to improve the pressing availability of the second bolt means 23 against the spacer 20.

Furthermore, inasmuch as holder fixing means B is detachably mounted to the rod holder means A as has been mentioned in the foregoing description, various diameters of cylindrical members 14 may be prepared beforehands independently of the rod holder means A. By so doing, a single rod holder means is applicable enough through the rod fixing means B to any different diameter of the rod hole H and to the width and shape of the gunnel C.

While the specification concludes with claims particularly pointing out and distinctly claiming the subject-matter of the invention, the invention will be better understood from the following description taken in correction with the accompanying drawings.

What is claimed is:

1. A fishing rod holder fixing means, comprising a lengthy base having an axis and having a channel shaped cross section;
   a rod holder means for detachably holding a grip portion of a fishing rod, provided at one end of the upper surface of said base;
   a rod supporting means provided at the other end of said base;
   a pair of plates mounted substantially intermediate of the bottom surface of said base and being selectively movable in relation to each other;
   an angle adjusting means bored with a hole;
   a cylindrical member supported between said pair of plates in pivotally movable relation with respect to a direction transvers to said axis of said base and supporting said angle adjusting means screwably contactable therewith, wherein said cylindrical member is positioned in a rod hole formed on a gunnel of a boat;
   said cylindrical member is a hollow cylinder having at least a greater inner diameter than the outer diameter of said angle adjusting means;
   a first pair of holes bored in said cylindrical member and adjacent to the upper part thereof and across the axis thereof, said first pair of holes being greater in inner diameter than the outer diameter of said first bolt means;
   a second pair of holes bored in said cylindrical member, across the axis of said first pair of holes;
   a first bolt means slidably inserted into said first pair of holes with an end thereof being in screwably adjustable relation by means of a suitable nut;
   a third pair of holes bored in said cylindrical member in a position lower than said second pair of holes, and in axial alignment therewith;
   a second bolt means slidably inserted into said third pair of holes and having one end thereof screwably tightened by means of a thumbscrew;
   nut means supported within said cylindrical member in slidable relation with respect to said first bolt means;
   a spacer means bored with a hole adjacent to the upper portion thereof and disposed outside of said cylindrical member;
   a third bolt means inserted through said second pair of holes and said hole of said spacer means and having a foremost end thereof screwably connected with said nut means in screwably adjustable relation with respect to said spacer means and the outer circumferential surface of said cylindrical member, thereby to selectively adjust the space therebetween;
   said spacer means having an inner surface area contactable with one end of said second bolt means inserted through said third pair of holes, in downwardly inclined relation with respect to the axis of said cylindrical member and adapted so that said inner surface area is adjustably pressed by means of a thumb nut integrally formed with the other end of said second bolt means;
   adjustable rod support provided at the lower portion of said cylindrical member; and
   said cylindrical member having a plurality of slits formed axially of the and in the lower portion thereof, so as to be slidably engaged with said adjustable rod support.

* * * * *